(12) United States Patent
Thomas et al.

(10) Patent No.: US 12,341,808 B1
(45) Date of Patent: Jun. 24, 2025

(54) DETECTING AUTOMATED ATTACKS ON COMPUTER SYSTEMS USING REAL-TIME CLUSTERING

(71) Applicant: Akamai Technologies, Inc., Cambridge, MA (US)

(72) Inventors: Tyson J. Thomas, San Francisco, CA (US); Zhige Xin, Sunnyvale, CA (US)

(73) Assignee: Akamai Technologies, Inc., Cambridge, MA (US)

(*) Notice: Subject to any disclaimer, the term of this patent is extended or adjusted under 35 U.S.C. 154(b) by 211 days.

(21) Appl. No.: 17/671,349

(22) Filed: Feb. 14, 2022

Related U.S. Application Data

(60) Provisional application No. 63/211,651, filed on Jun. 17, 2021.

(51) Int. Cl.
*H04L 9/40* (2022.01)

(52) U.S. Cl.
CPC ...... *H04L 63/1458* (2013.01); *H04L 63/0236* (2013.01); *H04L 63/1416* (2013.01); *H04L 63/1425* (2013.01); *H04L 63/20* (2013.01)

(58) Field of Classification Search
CPC ...... G06F 21/54; G06F 21/554; G06F 21/566; G06F 21/577; G06F 21/64; G06F 21/44
See application file for complete search history.

(56) References Cited

U.S. PATENT DOCUMENTS

| | | | |
|---|---|---|---|
| 8,424,091 B1* | 4/2013 | Su | H04L 51/212 713/188 |
| 9,076,013 B1* | 7/2015 | Bailey, Jr. | G06F 21/577 |
| 9,875,360 B1* | 1/2018 | Grossman | A63F 13/75 |
| 9,923,909 B2* | 3/2018 | Lietz | H04L 63/14 |
| 9,978,067 B1* | 5/2018 | Sadaghiani | H04L 63/1416 |
| 10,044,748 B2* | 8/2018 | Dagon | G06F 16/951 |
| 10,075,463 B2* | 9/2018 | Zhang | H04L 63/1425 |
| 10,326,789 B1* | 6/2019 | Vines | H04L 67/02 |

(Continued)

FOREIGN PATENT DOCUMENTS

| | | | | |
|---|---|---|---|---|
| CN | 110912874 A | * | 3/2020 | ............. G06N 20/00 |
| EP | 3531329 A1 | * | 8/2019 | ............. G06F 16/38 |
| WO | WO-2006138469 A2 | * | 12/2006 | ........... G05B 23/024 |

OTHER PUBLICATIONS

Steven Gianvecchio, Mengjun Xie, Zhenyu Wu, and Haining Wang Humans and Bots in Internet Chat: Measurement, Analysis, and Automated Classification IEEE/ACM Transactions on Networking, vol. 19, No. 5, Oct. 2011 (Year: 2011).*

*Primary Examiner* — Han Yang
(74) *Attorney, Agent, or Firm* — David H. Judson

(57) ABSTRACT

A bot detection service is enhanced by providing improved threat scoring using dynamic clustering of telemetry data received from a server. The detection approach leverages the notion that bot traffic is statistically anomalous compared to empirical models of human traffic. In particular, bots have more similar and repeating network patterns (i.e., lists of field values derived from client telemetry) that lend themselves to tighter clustering than random human traffic. The technique herein leverages this notion by providing a bot detection service with a network pattern clustering algorithm that differentiates bot-versus-human traffic by searching for similar and repeating network patterns that cluster together by virtue of having lesser variation (as compared to human traffic) in their field value sets.

14 Claims, 4 Drawing Sheets

(56) References Cited

U.S. PATENT DOCUMENTS

| | | | | |
|---|---|---|---|---|
| 10,826,920 | B1* | 11/2020 | Lin | H04L 63/0236 |
| 11,297,074 | B1* | 4/2022 | Vincent | G06F 21/566 |
| 2008/0262990 | A1* | 10/2008 | Kapoor | H04L 63/145 |
| | | | | 706/20 |
| 2011/0238855 | A1* | 9/2011 | Korsunsky | H04L 63/1441 |
| | | | | 709/231 |
| 2014/0012847 | A1* | 1/2014 | Barnes | G06F 8/75 |
| | | | | 707/E17.046 |
| 2016/0099963 | A1* | 4/2016 | Mahaffey | G06F 21/554 |
| | | | | 726/25 |
| 2019/0138939 | A1* | 5/2019 | Devaraju | G05B 23/0289 |
| 2019/0258807 | A1* | 8/2019 | DiMaggio | G06F 21/577 |
| 2020/0099714 | A1* | 3/2020 | Haridas | G06N 3/088 |
| 2020/0244673 | A1* | 7/2020 | Stockdale | H04L 41/40 |
| 2021/0117868 | A1* | 4/2021 | Sriharsha | G06F 16/24568 |
| 2021/0400065 | A1* | 12/2021 | Herley | H04L 63/1441 |
| 2022/0253527 | A1* | 8/2022 | Tripathi | G06F 16/906 |
| 2022/0318377 | A1* | 10/2022 | Edwards | G06F 21/52 |

* cited by examiner

DETECTING AUTOMATED ATTACKS ON COMPUTER SYSTEMS USING REAL-TIME CLUSTERING

BACKGROUND

Technical Field

This application relates generally to protecting websites and mobile applications (apps) from automated attacks by scripts or bots.

Brief Description of the Related Art

Detection of automated attacks or bots is difficult because they are constantly evolving and adapting to bypass detection algorithms. Detections based upon telemetry are vulnerable to improved synthetic telemetry from bots. Detections based upon valid configuration estimates are compromised by legal variations of client characteristics. The technique herein addresses these shortcomings in a novel way, namely, by exploiting the tendency for human traffic to exhibit more entropy than bot traffic.

BRIEF SUMMARY

A bot detection service, e.g., associated with an overlay network, is augmented to include a real-time clustering algorithm that leverages the notion that, typically, bot traffic is statistically anomalous compared to empirical models of human traffic. In particular, bots have more similar and repeating network patterns (i.e., collections of data field values provided to the bot detection service as telemetry) that lend themselves to tighter clustering than, e.g., random human traffic. Preferably, the bot detection service leverages the notion that human traffic tends to exhibit more entropy than bot traffic to provide more robust bot detection scoring (and thus detection).

According to one aspect, a method for detecting bots operates in association with a bot detection service and begins by receiving telemetry from an overlay network edge server at which client requests are being received. The telemetry comprises values from a diverse set of data fields, wherein a list of field values comprise a network pattern (NP). In this embodiment, the field values associated with a given combination pattern (of field values) are used to classify device characteristics associated with the given combination pattern. According to the approach herein, one or more field values other than those associated with the given combination pattern are also used to build, in real-time, one or more clusters of network patterns. A bot is then detected by identifying, from the clusters of network patterns and with respect to given time periods, repetitive field values that are not representative of typical random variation associated with human traffic (i.e., higher entropy). A bot score provided by the bot detection score is augmented to reflect that the telemetry exhibits less entropy than typical human traffic. The edge server receives the bot score as augmented and responds with a given mitigation action, e.g., blocking the client request, delaying a response to the client request, issuing a notification, or the like.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The following provides a description of an operating environment in which the techniques of this disclosure may be practiced. This operating environment is not intended to be limiting.

Figure 1:
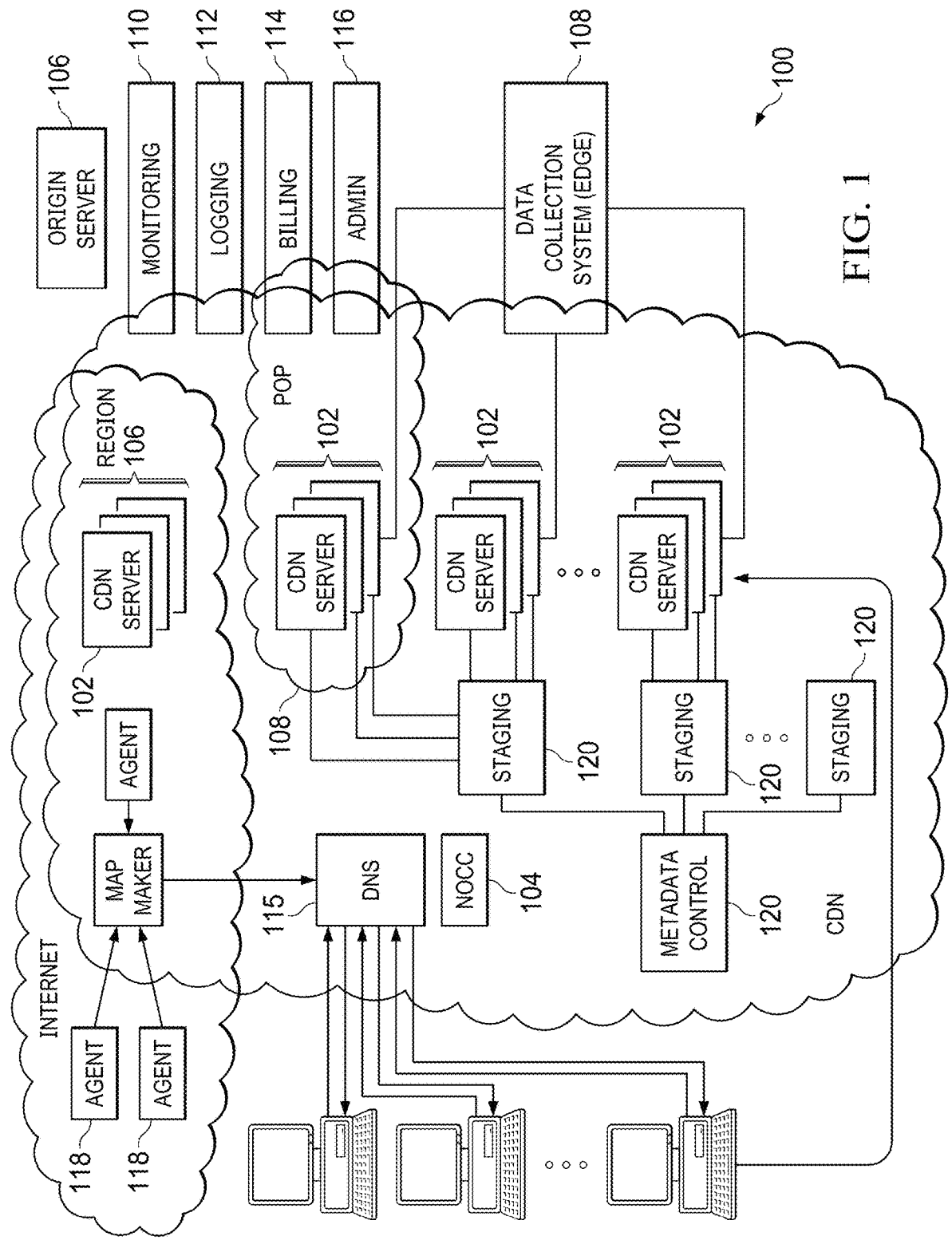
FIG. 1 is a distributed computer system in which the techniques of this disclosure may be practiced.

In a known system, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
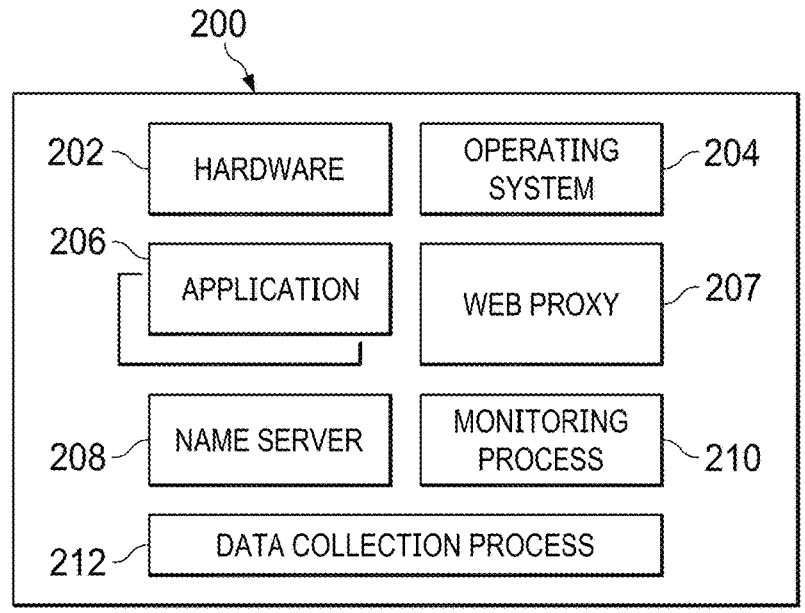
FIG. 2 is a machine that supports and executes an edge server at which the bot detection of this disclosure may be initiated.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
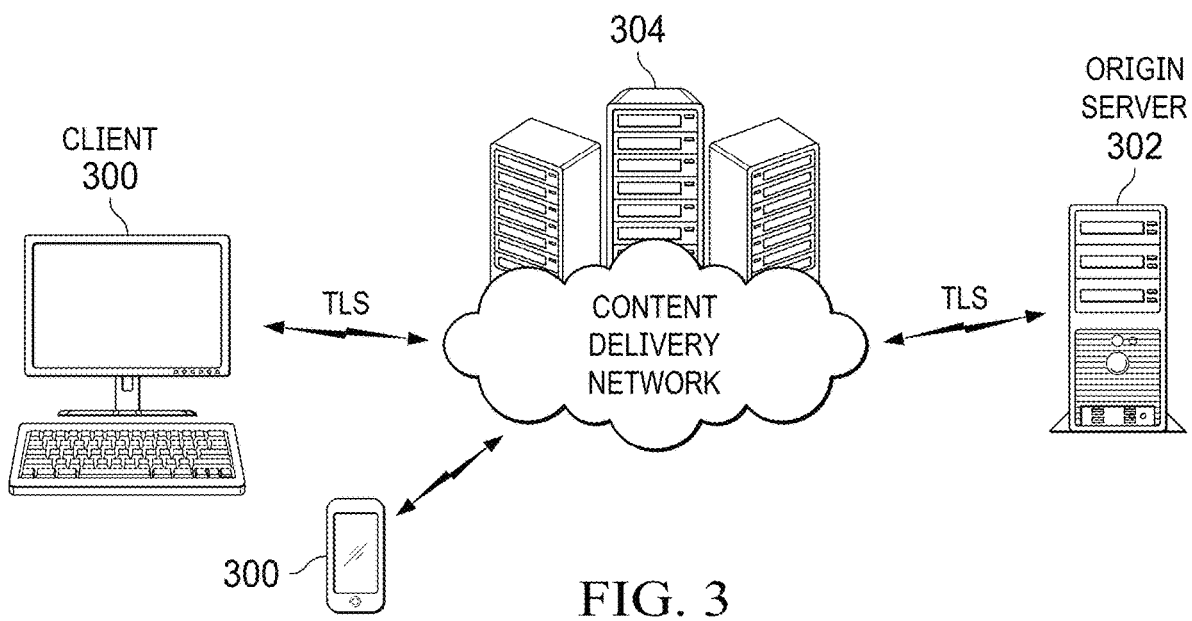
FIG. 3 depicts a typical end user interaction with an edge server of a content delivery network (CDN), the CDN providing accelerated delivery of content published by a content provider.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that "hide" behind a proxy, send request at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Bot detection using information collected through JavaScript (JS) may proceed as follows. At step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

Figure 4:
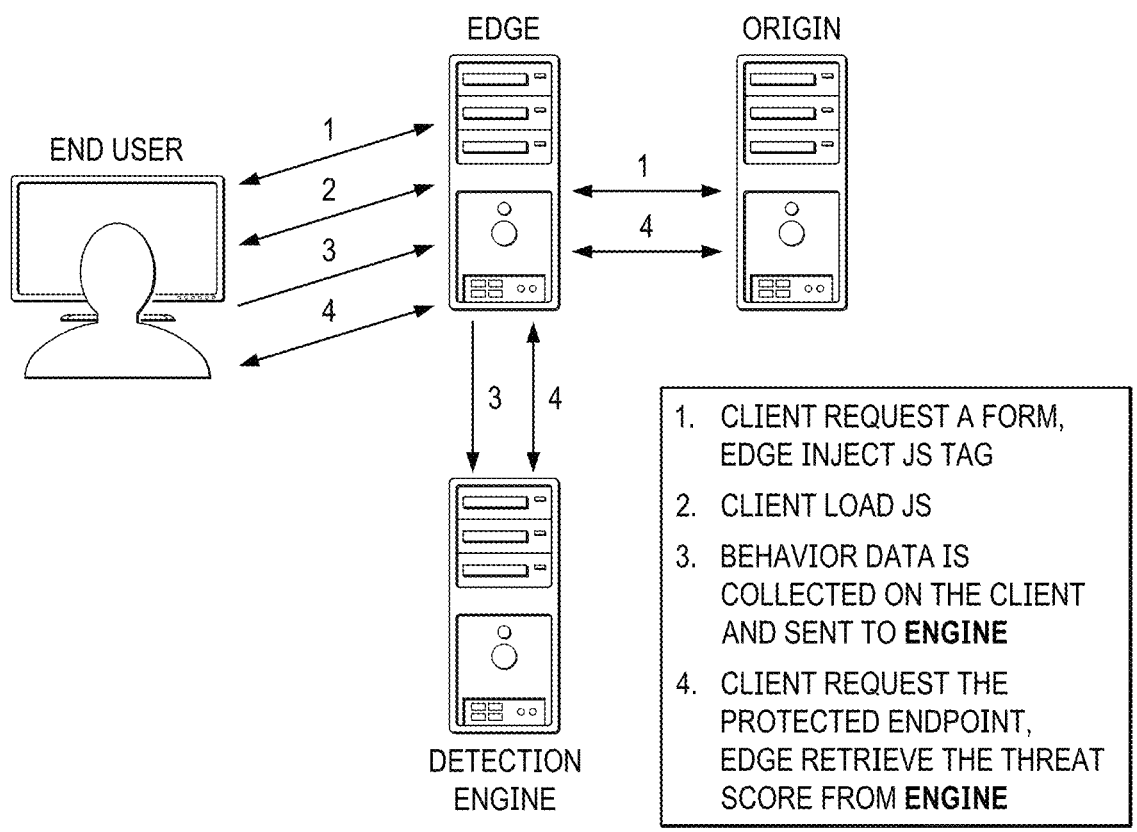
FIG. 4 depicts a bot detection service operating in association with the CDN.

Thus, and as depicted in FIG. 4, JavaScript-based technology collects a lightweight fingerprint and other behavioral data from the client. The data is collected asynchronously and sent to a bot detection engine. On a protected request (e.g., TLS-secured POST login), the edge server obtains the client classification from the bot detection engine and applies it on the edge.

Several methods may be used to detect bots using the fingerprint include, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

All of the above techniques can be modulated with other signals to produce higher accuracy.

It is also known to integrate the above-described scripting-based technology into a CDN service to protect web applications. Formally, the following glossary defines various terms used below to describe different elements of the architecture and the design: fingerprint: data (a data set) collected by a JavaScript or SDK running on a client; the fingerprint typically comprises one or more characteristics of the machine and web browser, such as the screen size, browser version, font supported, browser plugins installed;
  telemetry: data recording user behavior, such as (without limitation) mouse movement, gyroscope data, keystrokes, touch screen interaction;
  sensor data: a collection of the fingerprint and the telemetry being sent by the client machine;
  bot detection service: a computing infrastructure (machines, devices, appliances, software, database, data, etc.) that evaluates the sensor data;
  bot detection service cluster: a set of servers, e.g., running a bot detection engine, and that evaluate the sensor data for a given CDN customer;
  bot detection service API: an Application Programming Interface (API) that receives the sensor data and allows an edge server (or other permitted requesting entity) to retrieve a threat score, e.g., by issuing a Get Threat Score (GTS) request;
  threat score: a client classification (bot or human) returned by the bot detection service based on the evaluation of the sensor data;
  autopost: a JSON-formatted POST request that is generated by the bot detection service JavaScript on the client side and that carries the sensor data;
  user behavior analysis: the process of collecting fingerprint and telemetry from the client to evaluate the behavior of the user to classify it as a human or bot;
  credential abuse: a type of web attack that typically comprises replaying a known list of valid credentials (username+password) against various web sites in an attempt to take over the account;
  gift card abuse: a type of web attack that consist in guessing the PIN code associated with a gift card through a brute force attack;
  scraper reputation: the reputation of an IP address (IP) in a client reputation "scrapper" category;
  base page: a main HTML page that hosts the code for the main structure, content of the page and that typically references additional objects such as JavaScript, style sheets, images; and
  protected resource/endpoint/API: a web resource/URL to be protected.

The integration of a JavaScript-based bot detection service technology into an overlay network (e.g., CDN) ecosystem is also known. As generally described above, the overlay network platform may have its own bot management detection framework. As also described above, an overlay platform comprises a set of distributed technologies that are accessible, e.g., via a customer configuration portal. As described herein, the JavaScript technology is integrated into the overlay network framework, preferably as a new detection method. The user, when interacting with the portal, sees new detection methods available in the bot manager detection configuration application and may be requested to specify an endpoint to be protected. For convenience of explanation only, the focus for this detection method is the transactional use case such as account login, account creation, checkout flow, customer loyalty reward programs and finally flight, room or event ticket search workflow.

These use cases are not intended to be limiting.

Threat Scoring Clustering Algorithm, and Dynamic Clustering

The technique herein detects bots using empirical data models and real-time clustering of field value patterns. The approach leverages the general notion that bot traffic is statistically anomalous compared to empirical models of human traffic. In particular, bots have more similar and repeating network patterns (i.e., lists of field values) that lend themselves to tighter clustering than random human traffic. The approach herein is extensible to any number of fields comprising the network pattern.

In particular, the approach herein preferably leverages a clustering algorithm for "Get Threat Score" (GTS) requests that are issued to the bot detection service, typically from an edge server in the overlay network that has been provisioned/configured to provide bot detection. According to the approach herein, the clustering algorithm is designed to detect bots using valid "device anomaly" (so-called DAN) patterns. Bot attempts typically have high network pattern (NP) similarity to one another, while human attempts typically are widespread across different clusters. The clustering algorithm provides a statistical linear integration of NP granular similarity for human operator thresholding. Preferably, it operates as an inline real-time clustering mechanism, where patterns are formed preferably in fixed bucketing intervals of a given time (e.g., measured in minutes). In operation, the mechanism assigns a confidence score to each attempt, e.g., by calculating similarity to other clusters from previous and current time windows. A higher score indicates an attempt matching (or tending to match) clusters associated with bot traffic. In practice, a score above a customer- or system-configured threshold is then marked as a threat.

The clustering algorithm preferably forms clusters for each valid (TLS+header UA) pattern. In one example embodiment, the following attempt processing steps are implemented. In particular, and within each (TLS+header UA) pattern, NP is clustered by similarity. The cluster that has the highest similarity to an NP increments the count of that cluster. A new cluster is formed for every NP below a similarity threshold (e.g., 50%, although this percentage is not intended to be limiting). In a preferred embodiment, the algorithm scores an incoming NP by weighted average similarity to all clusters from previous and current time windows, preferably weighed by a ratio of observed to expected count from the pattern. The score is then converted to a confidence using a score distribution. In particular, and to obtain the score distribution, preferably scores of all patterns are tracked during a time window. At the end of the time window, preferably the list is trimmed (e.g., using human volume estimates) to cut off excess count(s) from the top of the scores list (presumed bots). The mean and standard deviation of human scores are calculated. Score to confidence conversion involves calculating the mean and standard deviations of human score per time bucket per (TLS+header) pattern. The previous time bucket statistics are used to convert current bucket scores to confidence level, and the confidence value is then determined statistically, e.g., using a Z-score estimate.

Preferably, the bot detection service stores the structure in local memory and updates a central database at regular intervals. In one embodiment, the structure comprises two kinds of patterns, DAN pattern, and cluster pattern. The clustering algorithm assumes that a bot will have a consistent and repeating network pattern (NP), i.e., a list of field values. In operation, a pattern list is formed using data fields (in particular, their values) present in an incoming process_attempt (a get threat score (GTS)) request. The system process extracts the data fields from request data. As noted above, the clustering algorithm generates a confidence score, and a score above a configurable threshold is marked as a threat (a bot).

Figure 5:
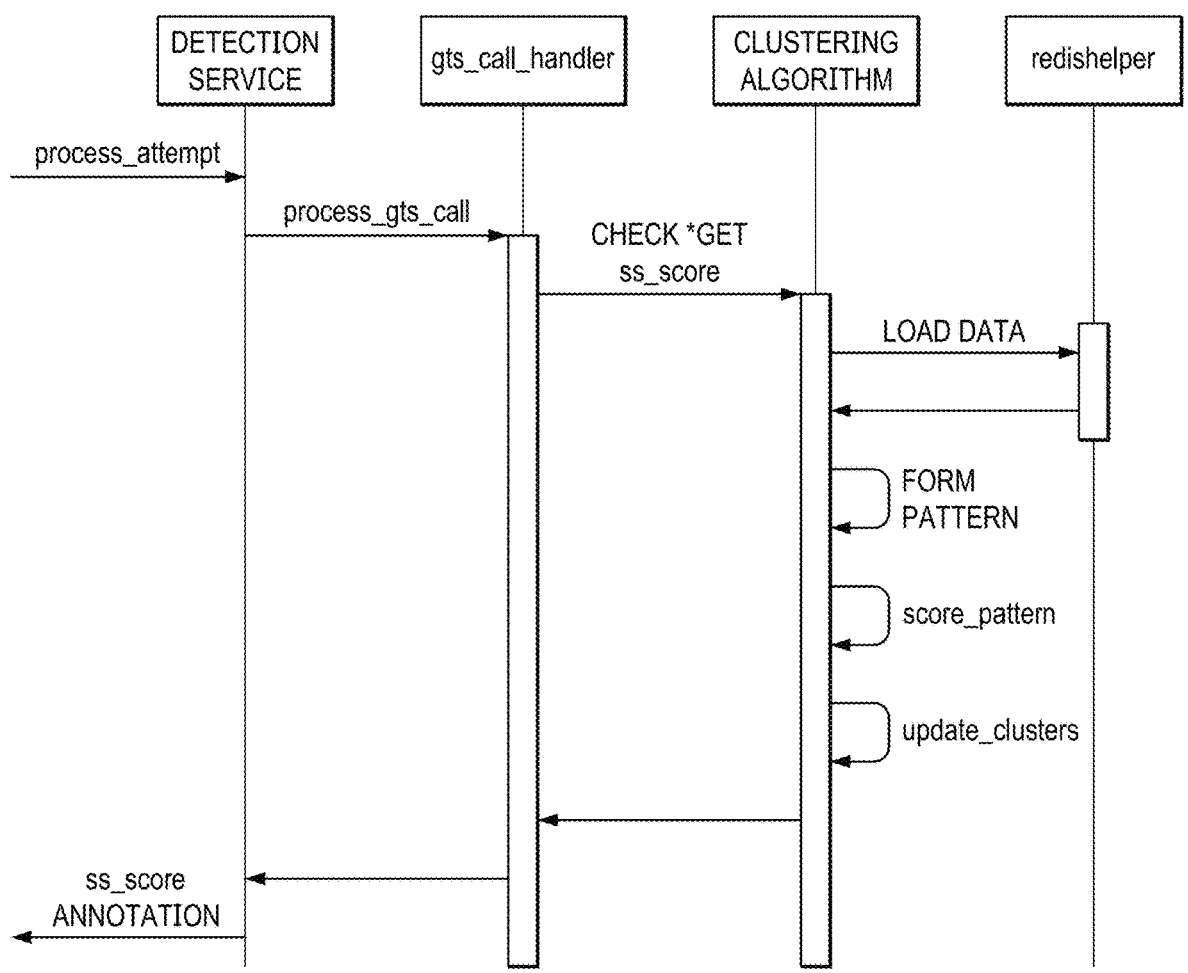
FIG. 5 depicts representative embodiment of a bot detection service that is augmented according to this disclosure to utilize a real-time clustering algorithm to enable more fine-grained differentiation between a human and a bot.

FIG. 5 depicts a representative embodiment. As noted above, and at the first step, a request for a threat score (the process_attempt) is received at the bot detection service. Typically, this request is received from an edge server in the overlay network that has received client-originated traffic and that needs to determine if the traffic is representative of a human or a bot. In process_gts_call handler, a clustering algorithm check is added (the check get ss_score). In particular, when a GTS request arrives the detection service forms a DAN hash (e.g., an MD5 or SHA-1), and the bot detection service also loads information (e.g., from a redishelper function) required for processing the current DAN pattern in local cache. First, the attempt is scored. If the attempt qualifies a function score_pattern is called. Function score_pattern calculates an algorithm confidence score, e.g., based on current and previous clusters. The score is normalized and compared with a threshold, e.g., a customer profile threshold. If the score exceeds the threshold, the score is returned or logged, e.g., based on a block/monitor mode. A block mode indicates that a positive score (i.e., a bot is indicated) has been indicated and the request should be blocked (at the edge server). If monitor mode is set, the score is logged in a threat debugger and normal processing is continued. As depicted, in this embodiment the output of the processing annotates the score that is returned to the edge server from the bot detection service.

Bot attempts should have NP with high similarity to one another, so they should cluster together. A challenge, however, is that the bot NP is a subset of the total fields that may be available. Accordingly, the following similarity calculation may be used:

$$S(X, Y) = \frac{1}{d}\sum_{k=1}^{d} S_k(X_k, Y_k)$$

$$S_k(X_k, Y_k) = \begin{cases} 1 - p_k^2(X_k) & \text{if } X_k = Y_k \\ 0 & \text{otherwise} \end{cases}$$

In this computation, $S_k(X_k,Y_k)$ is the similarity between two values for the field $A_k$, d is the number of the fields, and $p_{k(X_k)}$ is the probability of the field $A_k$ to take the value of $X_k$. An alternative similarity measure to the one depicted above may use $p_k$ instead of $p_k^2$. Still other similarity measures include, without limitation, overlap measures, Eskin measures, IOF measures, Lin type measures, Goodall type measures, and the like.

Cluster management preferably involves fixing a maximum number of clusters (e.g., 100) per device category. Further, preferably old clusters with low quality are culled to maintain a constant cluster count. Cluster quality preferably is defined as (average similarity*hit count)/age, where hit count is how many times the cluster had the highest similarity to an incoming network pattern (NP), and age is a number of requests processed since cluster inception.

As mentioned, DAN pattern typically is a hash, while cluster pattern is a list of fields needed to form clusters. Examples data fields from web and mobile traffic data include, without limitation, referer (header extracted from request JSON), user_agent (extracted by javascript at client side), request_headers (field from JSON body), ip (/16) subnet (e.g., xxx.xxx), page_url, tcp (TCP hash field), tlshash, tls parameters, long-term cookie tlshash, abck_create_ts (service provider cookie creation time), ep_type (endpoint), asn (autonomous system number), asn reputation, co (country), xff_data (forwarding IPs), h2 (http2) hash, hash of canvas fingerprint (cfp, a finite set of browser fingerprint identifier calculated with javascript), browser parameters, display dimensions, font hash, web GL hash, permission hash, speech synthesis hash, timezone, battery charging status, battery charge level, app pack, sdk version, keyboard/mouse events, touch events, device orientation and motion, and others. Scoring typically relies on field value probabilities. Further, patterns may be categorized as a "basis" pattern, and a "combination" pattern. A basis pattern typically is a certain characteristic of a request/device/browser/OS that has cardinality and is sent along with an autopost request to the bot detection service. A combination pattern represents combinations (concatenations) of basis patterns, such as DAN #(e.g., cpf, certain browser parameters, etc.). Patterns (i.e., sensor data) are collected by scripts (e.g., Javascript) at the client, calculated by an edge server, or even part of the HTTP request. As noted, there are patterns specific to web and mobile traffic, and some are common to both kinds of requests.

Because fields have many values with different probabilities and large lookups for each field is too expensive (or because some field values (such as IP subnet) are not always available), preferably a dynamic clustering approach is used. According to the dynamic clustering approach herein, preferably the attempt to find a bot NP field subset is done on the fly. In particular, fields that have relatively uniform distributions are modeled by a field value probability average as a best estimator. Fields that have strongly skewed distributions preferably are modeled by a short list of top mode probabilities, as well as the average for the remaining tail value probabilities. For computation efficiency, field value probability lists preferably are hard-coded for improving performance, although this is not a requirement. Indeed, future versions anticipate dynamic modelling of field value probability lists, preferably on a per customer basis.

Dynamic clustering according to this disclosure is used to find attacks in traffic data and, in particular, by identifying repeating network patterns (NP) specific to a bot attack.

Preferably, there are two (2) stages of clustering. A first stage classifies client popularity into high, low and rare/invalid categories of device characteristics, preferably using models derived from global internet traffic. Typically, the first stage leverages some specified DAN #information, i.e., the combination of device characteristics, etc. Preferably, the second stage, and according to this disclosure, builds local dynamic clusters from the remaining field values, namely, those either not available in some specified DAN combination pattern, or that are otherwise too expensive to look up efficiently. These remaining field values are sometimes referred to as non-DAN fields that together are typically a list of strings, e.g., a vector of categorical vars (often non-numeric variable values from a finite set). Each cluster has statistics that typically are always changing over a sliding time window.

The technique herein has significant advantages. Human traffic is diverse with random variation, while bots tend to repeat some field values. As noted above, a score is created from the traffic volume and cluster similarity. The entropy of human traffic leads to lower similarity scores. Bots, however, tend to have not only higher volume but also higher similarity due to less variation in their field value sets. Global models and dynamic clustering according to this disclosure enable automated grouping and detection via similarity/traffic increases that are outside of the normal human traffic entropy. The approach herein significantly reduces false negatives for even sophisticated bots.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include Software as a Service (SaaS) (the provider's applications running on cloud infrastructure), Platform as a service (PaaS) (the customer deploys applications that may be created using provider tools onto the cloud infrastructure), and Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server. While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

As used herein, the following abbreviations have the following definitions. 'XHR' refers to an XMLHttpRequest Application Programming Interface (API). 'JS' refers to JavaScript. 'XML' refers to Extensible Markup Language. 'HTTPS' refers to Hypertext Transfer Protocol Secure. 'HTML' refers to Hypertext Markup Language. 'HTTP' refers to Hypertext Transfer Protocol. 'TLS' refers to Transport Layer Security. 'SDK' refers to Software Development Kit. 'IP' refers to Internet Protocol. 'UA' refers to User Agent. 'IOF' refers to Inverse Occurrence Frequency. 'CNAME' refers to Canonical Name. 'DNS' refers to Domain Name Service. 'SSL' refers to Secure Sockets Layer. 'VIP' refers to Virtual IP. 'DAN' refers to device anomaly. 'JSON' refers to JavaScript Object Notation.

What is claimed follows below.

The invention claimed is:

1. A method for detecting bots, comprising:
receiving telemetry comprising values from a diverse set of data fields, wherein a list of data field values comprise a network pattern (NP);
using data field values associated with a given combination pattern to classify device characteristics associated with the given combination pattern;
using data field values other than the data field values associated with the given combination pattern to build, in real-time, lists of data field values that represent network patterns;
detecting a bot in real-time by identifying, from the network patterns that are built in real-time, similar and repetitive lists of data field values that are not representative of random variation associated with human traffic.

2. The method as described in claim 1 wherein the network pattern is collected by executing a script at a requesting client.

3. The method as described in claim 1 further including classifying the given combination pattern according to one of a set of categories of device characteristics using Internet traffic models.

4. The method as described in claim 3 wherein the set of categories of device characteristics comprise high, low and rare/invalid categories.

5. The method as described in claim 1 wherein the network patterns are built dynamically in response to a request for a threat score.

6. The method as described in claim 5 wherein the request for a threat score is received from a server in an overlay network.

7. The method as described in claim 6 further including providing a response to the request for the threat score, the response having been annotated to reflect detection of the bot.

8. The method as described in claim 1 wherein data field values in the network patterns comprise statistics that continuously change over a time window.

9. The method as described in claim 1 wherein the network patterns are formed with respect to fixed bucketing intervals of a given time.

10. The method as described in claim 9 wherein the given time is on the order of minutes.

11. The method as described in claim 9 further including calculating similarity to network patterns from one of: a previous time window, a current time window, and a previous and current time window.

12. An apparatus, comprising:
a hardware processor;
computer memory comprising computer program code executed by the hardware processor to differentiate traffic received at a server as bot traffic or human traffic, the program code configured to:
receive telemetry comprising values from a diverse set of data fields, wherein a list of data field values comprise a network pattern (NP);
use data field values associated with a given combination pattern to classify device characteristics associated with the given combination pattern;
use data field values other than the data field values associated with the given combination pattern to build, in real-time, lists of data field values that represent network patterns; and
detect a bot in real-time by identifying, from the network patterns that are built in real-time, similar and repetitive lists of data field values that are not representative of random variation associated with human traffic.

13. The apparatus as described in claim 12 wherein the program code is further configured to provide an indication that the traffic received at the server is a bot.

14. The apparatus as described in claim 12 wherein the program code is applied in real-time to build the lists of data field values that represent network patterns in response to a request for a threat score received from the server.

* * * * *